United States Patent [19]

Schmidt

[11] 3,916,638

[45] Nov. 4, 1975

[54] WATER TO AIR HEAT PUMP UTILIZING HEAT RECOVERY WATER HEATING

[75] Inventor: A. Carl Schmidt, Fort Lauderdale, Fla.

[73] Assignee: Weil-McLain Company, Inc., Dallas, Tex.

[22] Filed: June 25, 1974

[21] Appl. No.: 483,012

[52] U.S. Cl. .................... 62/238; 62/324; 62/160
[51] Int. Cl.² ........................................ F25B 27/02
[58] Field of Search ............. 62/324, 325, 159, 160, 62/238

[56] References Cited
UNITED STATES PATENTS

| | | | |
|---|---|---|---|
| 2,135,285 | 11/1938 | Gibson | 62/160 |
| 2,751,761 | 6/1956 | Borgerd | 62/324 |
| 3,264,839 | 8/1966 | Harnish | 62/324 |
| 3,308,877 | 3/1967 | Gerteis | 62/324 |

*Primary Examiner*—William J. Wye
*Attorney, Agent, or Firm*—Lane, Aitken, Dunner & Ziems

[57] ABSTRACT

A water to air heat pump in which a heat exchange fluid is circulated between two heat exchangers with one normally operating as a condenser and the other normally operating as an evaporator. A third heat exchanger is provided for the purposes of heating an external water supply and, in the normal operation of the system, a switching means selectively switches the flow of heat exchange fluid from the output of the evaporator to either the condenser or the third heat exchanger. The heat pump is adapted to operate in a reverse mode in which the functions of the first two above-mentioned heat exchangers are reversed and in which the flow of fluid bypasses the third heat exchanger.

3 Claims, 1 Drawing Figure

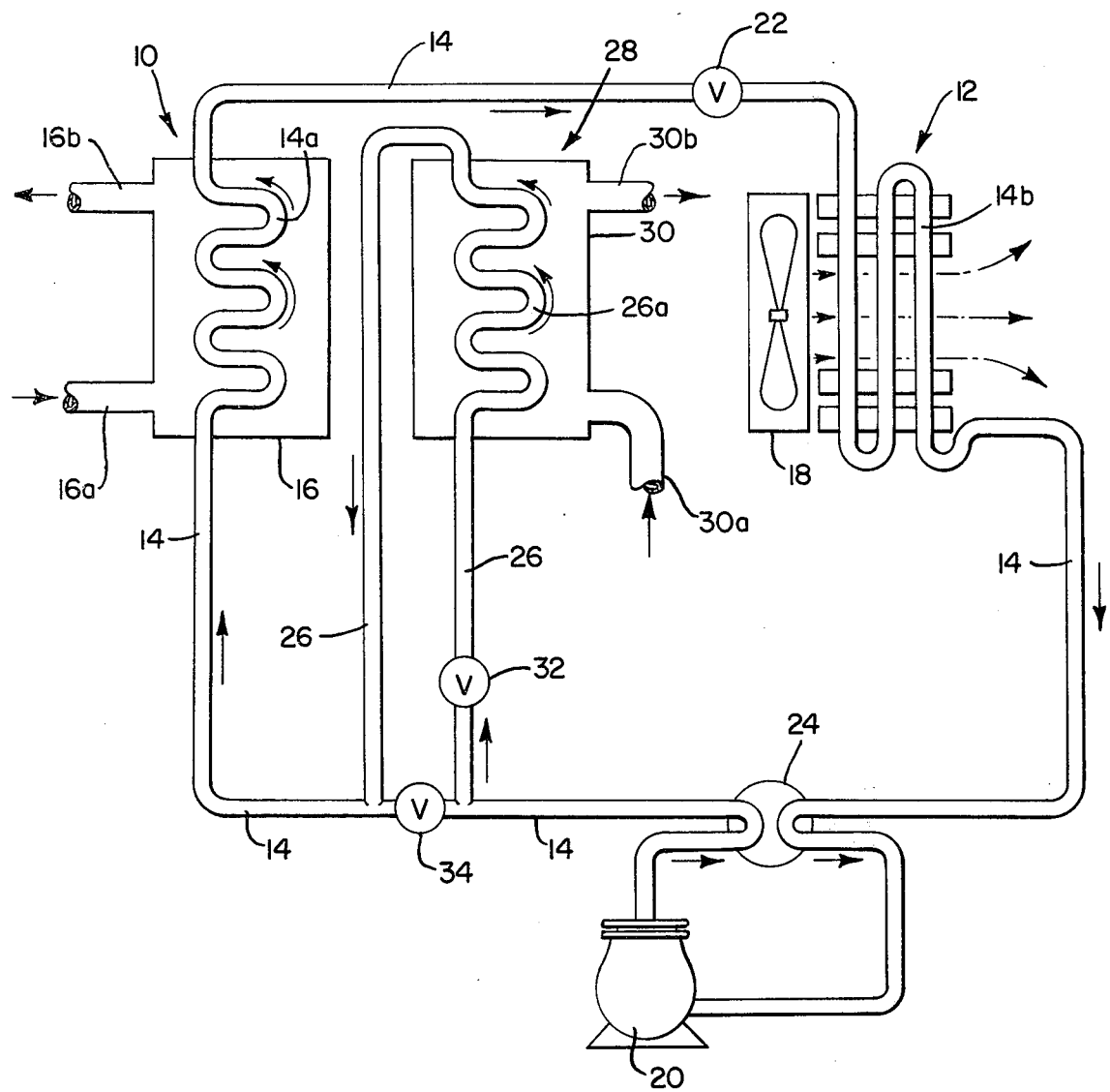

WATER TO AIR HEAT PUMP UTILIZING HEAT RECOVERY WATER HEATING

BACKGROUND OF THE INVENTION

This invention relates to a water to air heat pump and, more particularly, to such a heat pump which is adapted to transfer a portion of the heat energy in the heat pump to an auxiliary heat exchanger.

The desirability of recovering the heat energy extracted from a heat exchange medium in an air conditioning system and/or a heat pump has long been recognized. For example, in a standard air cooling system, heat is extracted from air that is discharged into the area to be cooled by passing the air over a coil containing a relatively cool heat exchange fluid. The heat exchange fluid carrying the heat energy received from the air is then usually directed to a condenser or the like for further treatment in accordance with conventional methods.

Although it has been previously suggested to route the heat exchange fluid containing the heat energy from the air through an auxiliary heat exchanger for the purposes of heating water, for example, these systems suffer from the fact that they are largely confined to "air-to-air" systems in which the condensing portion of the system utilizes air as a cooling medium therefore confining the system to outdoor environments. These type of systems, including those not confined to an air-to-air condenser, also suffer from a lack of flexibility in that the system is not readily adaptable to different operating modes such as switchability between a conventional mode in which the heat exchange fluid carrying the heat extracted from the air is passed directly to the condenser and a mode in which the fluid is passed through the auxiliary heat exchanger before being passed to the condenser.

SUMMARY OF THE INVENTION

It is, therefore, an object of the present invention to provide a water to air heat pump of the above type in which a portion of the heat energy developed can be used to heat an external medium, such as a supply of domestic water.

It is a further object of the present invention to provide a heat pump of the above type which enables the heat energy extracted from the air to be selectively routed to different areas of the system according to specific design requirements.

It is a more specific object of the present invention to provide a heat pump of the above type in which the heat exchange fluid containing the heat extracted from the air at an evaporator can be passed to the condenser either directly or through an auxiliary heat exchanger.

It is a further object of the present invention to provide a heat pump of the above type in which the condenser is liquid cooled and may be installed indoors and in which the auxiliary heat exchanger may be used to heat a domestic water supply.

It is a further object of the present invention to provide a heat pump of the above type which is adaptable for use in a reverse mode, in which the conditioned air is heated and in which the auxiliary heat exchanger is bypassed.

Toward the fulfillment of these and other objects, the heat pump of the present invention comprises a first and second heat exchanger, means for circulating a heat exchange fluid from the outlet of said second heat exchanger to the inlet of said first heat exchanger, said first heat exchanger including means for passing air in a heat exchange relation to said fluid, said second heat exchanger including means for circulating a liquid in a heat exchange relation to said fluid, said first heat exchanger adapted to act as an evaporator and evaporate said fluid and cool said air and said second heat exchanger adapted to act as a condenser and condense said fluid, a third heat exchanger, said circulating means adapted to circulate said fluid from the outlet of said first heat exchanger to the inlets of second and third heat exchangers, and switching means for selectively switching the flow of fluid from said first heat exchanger to said second heat exchanger or to said third heat exchanger.

BRIEF DESCRIPTION OF THE DRAWING

The drawing is a schematic representation of the heat pump of the present invention.

DESCRIPTION OF THE PREFERRED EMBODIMENT

Referring specifically to the drawing, the reference numeral 10 refers in general to a heat exchanger which normally functions as a condenser, and the reference numeral 12 refers to an additional heat exchanger which normally functions as an evaporator. A flow line 14 provides a continuous flow path for a heat exchange fluid, such as freon, in a circuit including the heat exchangers 10 and 12.

The heat exchanger 10 includes a water jacket 16 surrounding a coiled portion 14a of the flow line 14, and having an inlet 16a for connection to a source of relatively cool water, and an outlet for discharge back to the water source. An example of such a water source would be a cooling tower, or the like, which cools the water received from the outlet 16b of the jacket 16 before circulating it back into the inlet 16a, in a conventional manner.

The evaporator 12 includes a fan 18 which operates to discharge air across an additional coiled portion 14b of the line 14 and into the particular area to be cooled, such as a room of a building or the like.

A compressor 20 and an expansion valve 22 are disposed in the line 14 and function to compress and expand the heat exchange fluid, respectively in a conventional manner.

A flow direction control valve 24 is disposed in the line 14 between the heat exchanger 12 and the compressor 20, and operates to control the direction of the flow of the heat exchange fluid in the line 14. In particular, in the normal, or air-cooling, mode of the heat pump the position of the valve is such that flow of the heat exchange fluid in the line 14 is in the direction shown by the flow arrows in the drawing. The valve 24 can also operate to reverse the flow of fluid in the line 14 so that it flows in a direction opposite to that shown by the flow arrows, in which case the air from the fan 18 is heated as it passes over the coil 14b, as will be described in detail later. Since the valve 24 is of a conventional design, it will not be described in any further detail.

A flow line 26 is connected to the line 14 at two points between the compressor 20 and the heat exchanger 10 for supplying the heat exchange fluid to a third heat exchanger 28. The latter heat exchanger includes a water jacket 30 which surrounds a coiled portion 26a of the line 26 and which has an inlet 30a and an outlet 30b for connection to an external source of water to be heated. Since the heat pump of the present invention is readily adaptable for installation in an indoor environment, especially due to the fact that liquid is circulated through the jacket 16 of the heat exchanger 10, it can be appreciated that the above-mentioned external water source could be a domestic water supply.

A valve 32 is disposed in the line 26 between the compressor 20 and the heat exchanger 28, and a valve 34 is disposed in the line 14 between the heat exchanger 10 and the connection between the line 26 and the line 14. The valves 32 and 34 operate to selectively control the flow of the heat exchange fluid through the lines 26 and 14, respectively, under conditions to be described later.

In operation, and assuming it is desired to operate the heat pump in an air cooling mode and to utilize the heat exchanger 28 to heat a domestic water supply, the flow direction control valve 24 is positioned to cause the heat exchanger fluid to flow in the line 14 in the direction indicated by the arrows, the valve 32 is opened and the valve 34 is closed. In this mode, the heat exchanger 12 operates as an evaporator to cool the air passing over the coil 14b and into the area to be cooled while the heat exchangers 28 and 10 operate as a primary and a secondary condenser, respectively. In particular, the evaporated heat exchange fluid flowing in the line 14 from the heat exchanger 12, and containing the heat energy extracted from the air, passes through the valve 24, the compressor 20, and through the open valve 32 in the line 26 and the coil 26a associated with the heat exchanger 28. Water from an external source, such as a domestic water supply, is circulated through the jacket 30 of the latter heat exchanger and a portion of the heat energy from the heat exchange fluid passing through the coil 26a is transferred to the water. Thus, in addition to functioning as a primary condenser, the heat exchanger 28 also serves to heat the water from the domestic water supply.

The heat exchange medium passing from the outlet of the heat exchanger 28 then flows back through the line 26 to the flow line 14 whereby it is passed to the heat exchanger 10 and is condensed in a conventional manner, as discussed above. The heat exchanger 10 thus functions as a secondary condenser to increase the efficiency of the heat pump.

If it is desired that the heat exchanger 28 be bypassed in the above-described air-cooling mode, the valve 32 is closed and the valve 34 is opened to direct the heat exchange fluid from the compressor 20 directly to the heat exchanger 10 for condensing in accordance with a regular mode of operation.

In the event it is desired that the heat pump of the present invention operate in a reverse, or air heating, mode, the valve 24 is positioned to reverse the flow of the heat exchange fluid and cause it to flow in the line 14 in a direction opposite to that shown by the arrows in the drawing. In this instance, the valve 32 would be closed, the valve 34 opened, and the heat exchanger 10 would operate as an evaporator to transfer heat energy from the water passing through the jacket 16 to the heat exchange fluid which, in turn, transfers the heat energy to the air from the fan 18 at the heat exchanger 12 which operates as a condenser. As a result, the area receiving the conditioned air from the fan 18 is heated.

Although not specifically shown in the drawing, it is understood that several components of the heat pump of the present invention can be electrically connected to facilitate the above operation of the system. For example, the valves 32 and 34 can be electrically operated and connected in an electrical circuit including the reversing valve 24 and a thermostat or the like associated with the source of water supplied to the heat exchanger 28. The connections could be such that movement of the reversing valve 24 to a mode in which the heat pump operates in its reverse flow, or air-heating, mode, causes the valve 32 to be automatically closed and the valve 34 automatically opened. In a similar manner, when the heat pump is to operate in its regular, or air-cooling mode the connections could be such that the valves 32 and 34 can be operated by the above-mentioned thermostat to selectively control the opening and closing of the valves 32 and 34 as discussed above to either include or exclude the heat exchanger 28 from the heat exchange fluid flow circuit in accordance with particular requirements of the system.

Also, it is understood that the movement of water through the heat exchangers 10 and 28 can be either by gravity or by small circulating pumps or the like (not shown) associated with each heat exchanger.

It is thus seen that the heat pump of the present invention enjoys the advantage of being flexible in operation in the sense that, in its cooling mode, the heat extracted from the air to be conditioned can be supplied either directly to the condenser or to the condenser via the auxiliary heat exchanger, and yet can be operated in a heating mode in which the auxiliary heat exchanger is bypassed altogether. Also, the use of both of the heat exchangers 10 and 28 in the air-cooling mode increases both the efficiency and life span of the heat pump. Also, the heat pump of the present invention is easily adaptable for either home installation, apartments, or buildings which require selective cooling and heating and which have a need for heating an external source of water.

Of course, variations of the specific construction and arrangement of the heat pump disclosed above can be made by those skilled in the art without departing from the invention as defined in the appended claims.

I claim:

1. A heat pump comprising a first heat exchanger adapted to evaporate a heat exchange fluid and including means for passing air in a heat exchange relation to said fluid, a second heat exchanger adapted to condense said fluid and adapted for connection to an external cooling tower for circulating a liquid in a heat exchange relation to said fluid, a compressor unit connected to the outlet of said first heat exchanger, a third heat exchanger adapted to condense said fluid, first and second conduit means adapted to connect the outlet of said compressor unit to said second heat exchanger and to said third heat exchanger, respectively, first and second valve means connected in said first conduit means and said second conduit means, respectively, for selectively controlling the flow of fluid from said compressor unit to said second heat exchanger and to said third heat exchanger, third conduit means connecting the outlet of said third heat exchanger directly to said second heat exchanger, and fourth conduit means connecting the outlet of said second heat exchanger directly to said first heat exchanger.

2. The heat pump of claim 1 further comprising reversing valve means connected to at least one of said conduit means for reversing the flow of said fluid so that said first heat exchanger acts as a condenser and said second heat exchanger acts as an evaporator.

3. The heat pump of claim 1 wherein said third heat exchanger comprises a coil, and means for connecting said coil to a domestic water supply for circulating said water in a heat exchange relation to the fluid passing through said coil to heat said water.

* * * * *